United States Patent
Haramaty et al.

(10) Patent No.: US 11,102,146 B2
(45) Date of Patent: Aug. 24, 2021

(54) SCALABLE PIPELINE FOR EVPN MULTI-HOMING

(71) Applicant: MELLANOX TECHNOLOGIES TLV LTD., Raanana (IL)

(72) Inventors: Zachy Haramaty, Hemed (IL); Aviv Kfir, Nili (IL); Ilya Vershkov, Rishon Lezion (IL); Barak Gafni, Campbell, CA (US)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 149 days.

(21) Appl. No.: 16/706,892

(22) Filed: Dec. 9, 2019

(65) Prior Publication Data

US 2021/0176190 A1 Jun. 10, 2021

(51) Int. Cl.
| | |
|---|---|
| *H04L 12/927* | (2013.01) |
| *H04L 12/46* | (2006.01) |
| *H04L 29/06* | (2006.01) |
| *H04L 29/12* | (2006.01) |
| *H04L 12/911* | (2013.01) |

(52) U.S. Cl.
CPC ........ *H04L 47/806* (2013.01); *H04L 12/4641* (2013.01); *H04L 47/825* (2013.01); *H04L 61/2007* (2013.01); *H04L 63/101* (2013.01); *H04L 2212/00* (2013.01)

(58) Field of Classification Search
CPC ............... H04L 47/806; H04L 2212/00; H04L 61/2007; H04L 12/4641; H04L 63/101; H04L 47/825
See application file for complete search history.

(56) References Cited

U.S. PATENT DOCUMENTS

| | | | | |
|---|---|---|---|---|
| 10,841,216 | B1 * | 11/2020 | Hoang | .................. H04L 12/462 |
| 2011/0317703 | A1 * | 12/2011 | Dunbar | ................. H04L 12/462 370/392 |

(Continued)

FOREIGN PATENT DOCUMENTS

WO   WO-2014078743 A2 *  5/2014   ......... H04L 12/4625

OTHER PUBLICATIONS

Sajassi et al., "BGP MPLS-Based Ethernet VPN", Request for Comments: 7432, pp. 1-56, Feb. 2015.

(Continued)

*Primary Examiner* — Deepa Belur
(74) *Attorney, Agent, or Firm* — Kligler & Associates Patent Attorneys Ltd (57) ABSTRACT

One embodiment includes a network device including multiple interfaces to serve as ingress ports for receiving network packets from nodes in remote customer-site network(s) via a tunnel in a provider network, and from nodes in a local customer-site network, and egress ports for forwarding at least some of the network packets, and control circuitry to make a decision to drop a network packet to reduce packet duplication in at least one of the nodes, responsively to the network packet being identified as a packet of broadcast, unknown unicast, or multicast traffic, the network packet being subject to decapsulation of an encapsulation header, being assigned to one of the egress ports, and having a header including one of a plurality of virtual local area network identifications, or one of a plurality of source identifications.

15 Claims, 4 Drawing Sheets

(56) References Cited

U.S. PATENT DOCUMENTS

2016/0021015 A1* 1/2016 Thoria ............... H04L 47/2483
                                                       370/235
2021/0036950 A1* 2/2021 Zhu ..................... H04L 45/742

OTHER PUBLICATIONS

Sajassi et al., "A Network Virtualization Overlay Solution Using Ethernet VPN (EVPN)", Request for Comments 8365, pp. 1-33, Mar. 2018.

Sajassi., "EVPN: Network Virtualization Solution for Next Generation DCs & DC Interconnect", CISCO live, Las Vegas, NV, USA, pp. 1-98, Jun. 25-29, 2017.

* cited by examiner

ACCESS CONTROL LIST — 40

| ITEM | BUM | DECAP | EGRESS | VID | SOURCE IP |
|---|---|---|---|---|---|
| 1 | YES | YES | A | 3 | |
| 2 | YES | YES | B | 2 | |
| 3 | YES | YES | B | 4 | |
| 4 | YES | YES | A | | 11.11.11.12 |
| 5 | YES | YES | A | | 11.11.11.13 |
| 6 | YES | YES | B | | 11.11.11.14 |

42

SCALABLE PIPELINE FOR EVPN MULTI-HOMING

FIELD OF THE INVENTION

The present invention relates to computer networks, and particularly but not exclusively to, connectivity between customer sites.

BACKGROUND

An MPLS Virtual Private Network (VPN) consists of a set of customer sites that are interconnected by means of a Multiprotocol Label Switching (MPLS) provider core network. At each customer site, one or more customer edge (CE) devices attach to one or more provider edge (PE) devices.

An Ethernet VPN (EVPN) comprises CE devices that are connected to PE devices, which form the edge of the MPLS infrastructure or an EVPN Virtual Extensible local area network (VXLAN). A CE device can be a host, a router, or a switch. The PE devices provide Layer 2 virtual bridge connectivity between the CE devices. There can be multiple EVPNs in the provider network.

EVPN multihoming feature enables connection of a customer site to two or more PE devices to provide redundant connectivity. A CE device can be multihomed to different PE devices or the same PE device. A redundant PE device can provide network service to the customer site as soon as a failure is detected. Therefore, EVPN multihoming helps to maintain EVPN service and traffic forwarding to and from the multihomed customer site in the event of certain network failures.

The PEs may be connected by an MPLS Label Switched Path (LSP) infrastructure, which provides the benefits of MPLS technology, such as fast reroute, resiliency, etc. The PEs may also be connected by an IP infrastructure, in which case IP/GRE (Generic Routing Encapsulation) tunneling, VXLAN tunneling or other IP tunneling can be used between the PEs.

SUMMARY

There is provided in accordance with an embodiment of the present disclosure, a network device including multiple interfaces configured to serve as ingress ports for receiving network packets from nodes disposed in at least one remote customer-site network via a tunnel in a provider network, and from nodes in a local customer-site network, and egress ports for forwarding at least some of the network packets, so as to transfer packets between the nodes of the at least one remote customer-site network and the nodes of the local customer-site network, and control circuitry configured to analyze the received network packets and make a decision to drop a network packet of the received network packets to reduce packet duplication of the network packet in at least one of the nodes, responsively to the network packet being identified as a packet of broadcast, unknown unicast, or multicast (BUM) traffic, the network packet being subject to decapsulation of an encapsulation header of the network packet by the control circuitry, the network packet being assigned to one of the egress ports, and a header of the network packet including one of a plurality of virtual local area network (VLAN) identifications, or one of a plurality of source identifications.

Further in accordance with an embodiment of the present disclosure the control circuitry is configured to make the decision to drop the network packet responsively to the network packet being identified as a packet of BUM traffic, the network packet being subject to decapsulation of the encapsulation header of the network packet by the control circuitry, and the header of the network packet including one of the VLAN identifications, for which the assigned egress port is not a designated forwarder, or one of the source identifications of respective nodes disposed in the local customer-site network and connected to the assigned egress port.

Still further in accordance with an embodiment of the present disclosure the control circuitry is configured to make the decision to drop the network packet responsively to the network packet being identified as a packet of BUM traffic, the network packet being subject to decapsulation of the encapsulation header of the network packet by the control circuitry, and the header of the network packet including one of the VLAN identifications, for which the assigned egress port is not a designated forwarder.

Additionally, in accordance with an embodiment of the present disclosure the control circuitry is configured to make the decision to drop the network packet responsively to the network packet being identified as a packet of BUM traffic, the network packet being subject to decapsulation of the encapsulation header of the network packet by the control circuitry, and the header of the network packet including one of the source identifications of respective nodes disposed in the local customer-site network and connected to the assigned egress port.

Moreover, in accordance with an embodiment of the present disclosure the control circuitry is configured to identify the network packet as a packet of BUM traffic responsively to the header of the network packet and/or at least one local forwarding decision.

Further in accordance with an embodiment of the present disclosure each of the plurality of source identifications includes a source IP address.

Still further in accordance with an embodiment of the present disclosure, the device includes a memory configured to store at least one access control list, the control circuitry being configured to generate filter line items for populating the at least one access control list so that the control circuitry is configured to drop the network packet responsively to the network packet being identified as a packet of BUM traffic, the network packet being subject to decapsulation of the encapsulation header of the network packet by the control circuitry, the network packet being assigned to one of the egress ports, and the header of the network packet including one of the VLAN identifications, or one of the source identifications.

There is also provided in accordance with another embodiment of the present disclosure, a packet filtering method, including receiving network packets from nodes disposed in at least one remote customer-site network via a tunnel in a provider network, and from nodes in a local customer-site network, forwarding at least some of the network packets, so as to transfer packets between the nodes of the at least one remote customer-site network and the nodes of the local customer-site network, analyzing the received network packets and making a decision to drop a network packet of the received network packets to reduce packet duplication of the network packet in at least one of the nodes, responsively to the network packet being identified as a packet of broadcast, unknown unicast, or multicast (BUM) traffic, the network packet being subject to decapsulation of an encapsulation header of the network packet, the network packet being assigned to one of a plurality of egress ports, and a header of the network packet including one of a plurality of virtual local area network (VLAN) identifications, or one of a plurality of source identifications.

Additionally, in accordance with an embodiment of the present disclosure the making the decision to drop the network packet is performed responsively to the network packet being identified as a packet of BUM traffic, the network packet being subject to decapsulation of the encapsulation header of the network packet, and the header of the network packet including one of the VLAN identifications, for which the assigned egress port is not a designated forwarder, or one of the source identifications of respective nodes disposed in the local customer-site network and connected to the assigned egress port.

Moreover in accordance with an embodiment of the present disclosure the making the decision to drop the network packet is performed responsively to the network packet being identified as a packet of BUM traffic, the network packet being subject to decapsulation of the encapsulation header of the network packet, and the header of the network packet including one of the VLAN identifications, for which the assigned egress port is not a designated forwarder.

Further in accordance with an embodiment of the present disclosure the making the decision to drop the network packet is performed responsively to the network packet being identified as a packet of BUM traffic, the network packet being subject to decapsulation of the encapsulation header of the network packet, and the header of the network packet including one of the source identifications of respective nodes disposed in the local customer-site network and connected to the assigned egress port.

Still further in accordance with an embodiment of the present disclosure, the method includes identifying the network packet as a packet of BUM traffic responsively to the header of the network packet and/or at least one local forwarding decision.

Additionally, in accordance with an embodiment of the present disclosure each of the plurality of source identifications includes a source IP address.

Moreover in accordance with an embodiment of the present disclosure, the method includes storing at least one access control list, and generating filter line items for populating the at least one access control list so that the making the decision to drop the network packet is performed responsively to the network packet being identified as a packet of BUM traffic, the network packet being subject to decapsulation of the encapsulation header of the network packet, the network packet being assigned to one of the egress ports, and the header of the network packet including one of the VLAN identifications, or one of the source identifications.

There is also provided in accordance with still another embodiment of the present disclosure, a software product, including a non-transient computer-readable medium in which program instructions are stored, which instructions, when read by a central processing unit (CPU), cause the CPU to receive network packets from nodes disposed in at least one remote customer-site network via a tunnel in a provider network, and from nodes in a local customer-site network, forward at least some of the network packets, so as to transfer packets between the nodes of the at least one remote customer-site network and the nodes of the local customer-site network, analyze the received network packets and make a decision to drop a network packet of the received network packets to reduce packet duplication of the network packet in at least one of the nodes, responsively to the network packet being identified as a packet of broadcast, unknown unicast, or multicast (BUM) traffic, the network packet being subject to decapsulation of an encapsulation header of the network packet, the network packet being assigned to one of a plurality of egress ports, and a header of the network packet including one of a plurality of virtual local area network (VLAN) identifications, or one of a plurality of source identifications.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

As previously mentioned, EVPN multihoming feature enables connection of a customer site to two or more PE devices to provide redundant connectivity. Therefore, EVPN multihoming helps to maintain EVPN service and traffic forwarding to and from the multihomed customer site in the event of certain network failures.

However, providing redundancy while operating with Broadcast, Unknown unicast or Multicast (BUM) traffic may result in packet duplication, whereby a packet is sent to the same node in one of the customer sites.

By way of a first example, a customer edge (CE) device, CE1, in customer site A may send a packet to a CE device, CE2, in customer site B via a provider network. The packet may be sent via a provider edge (PE) device, PE1, on the edge of customer site A. Due to redundant connectivity, the packet may be sent via the provider network to a PE device, PE2, which is also on the edge of customer site A. PE2 may then send the packet back to CE1 and this could lead to duplication.

By way of a second example, CE1, in customer site A may send a packet to CE2, in customer site B via the provider network. The packet may be sent via PE1 which forwards the packet to both PE3 and PE4, which are PE devices on the edge of customer site B. PE3 and PE4 may forward the packet to CE2 and this could also lead to duplication.

The above duplication problems are discussed in more detail in RFCs 7432, 8365, which discuss using "split-horizon" for dealing with the problem of the first example, and "designated forwarder" for the problem of the second example.

Split horizon may be implemented by a PE device applying the following rule to a received packet, and dropping the packet if it complies with the rule:

BUM && neighbor_SIP && Egress_Port (rule 1), where && is a Boolean AND operator, "BUM" checks if the packet is a packet of BUM traffic, "neighbor_SIP" checks if the source IP address in the header of the packet is of a neighbor node in the local customer site, which is local to the PE device, and "Egress Port" checks if the egress port to which the packet is assigned is connected to the neighbor node. The "neighbor_SIP" and "Egress_Port" conditions may be implemented by having a list of neighbor_SIP and Egress Port pairs.

Designator forwarder may be implemented by a PE device applying the following rule for dropping a packet:

BUM && remote_SIP && VID && Egress_Port (rule 2), where "BUM" checks if the packet is a packet of BUM traffic, "remote_SIP" checks if the source IP address in the header of the packet is of a remote node which is in a remote customer site, i.e., not in the local customer site, "VID" and "Egress_Port" check if the header includes a virtual local area network identification (VID) which is not a designated forwarder for the egress port to which the packet is assigned. The "remote_SIP", "VID" and "Egress_Port" conditions may be implemented by having a list of remote_SIP, VID and Egress Port tuples for which the PE is not a forwarder.

The above rule can become very problematic as a network expands. For example, if the are 1000 remote SIPs and 4000 VIDs, there will be a list of 4 million filter line items in an access control list (ACL) for a given port.

Combining the two rules for split horizon and designated forwarder gives the following rule for dropping a packet:

BUM && neighbor_SIP && Egress_Port||BUM && remote_SIP && VID && Egress_Port (rule 3), where || is a Boolean OR operator.

The above (rule 3) may be rewritten as:

BUM && Egress_Port && (neighbor_SIP||remote_SIP && VID) (rule 4).

It is clearly seen that the above rules 2 and 4 are not scalable.

Embodiments of the present invention solve the above scalability problem by providing a network device which implements a scalable solution to the packet duplication problem in an EVPN multihoming environment. The network device applies novel rules to prevent packet duplication by removing the check for "remote_SIP" and replacing it by a check for decapsulation. When a packet enters the provider network, the packet is encapsulated, and when the packet leaves the provider network, the packet is decapsulated. Therefore, a packet received by a PE from a remote node is subject to decapsulation in the PE and therefore the remote_SIP check may be replaced by a check for decapsulation.

Therefore, rule 2, namely:

BUM && remote_SIP && VID && Egress_Port, may be replaced by

BUM && Decap && VID && Egress_Port (rule 5), where "Decap" checks if the packet is subject to decapsulation in the PE device. The use of the "Decap" condition in rule 5 is non-trivial. The "Decap" condition not only filters for "remote_SIP" but also "neighbor_SIP" from the provider network.

So based on the above example, of 1000 remote SIPs and 4000 VIDs, removing the "remote_SIP" check reduces the number of filter line items in the ACL from 4 million to 4000.

In some embodiments, rule 1, namely:

BUM && neighbor_SIP && Egress_Port, may be replaced by,

BUM && neighbor_SIP && Egress_Port && Decap (rule 6).

Adding a "Decap" check to the split horizon rule may be performed as the packet to be dropped according to the split horizon rule is a packet which comes from the provider network and therefore is subject to decapsulation in the PE.

In some embodiments, rule 5 and rule 6 may be combined to give:

BUM && Decap && VID && Egress_Port||BUM && neighbor_SIP && Egress_Port && Decap, which may be rewritten as:

BUM && Decap && Egress_Port && (VID||neighbor_SIP) (rule 7).

The above rule provides filtering for both split horizon and designated forwarder.

Therefore, if there are 4000 VIDs and 2000 neighbor_SIPs, there will be 6000 filter line items and not 8 million in the ACL due to the OR operator.

The above rules may be implemented in the PE device using one or more access control lists (ACLs) including the relevant values for the Egress Ports, VIDs, and neighbor_SIPs. Removing remote_SIP from the ACL(s) makes the ACL(s) scalable. The PE device may automatically generate the ACL filter line items to provide the filtering according to rules 5, 6, or 7 above.

System Description

Figure 1:
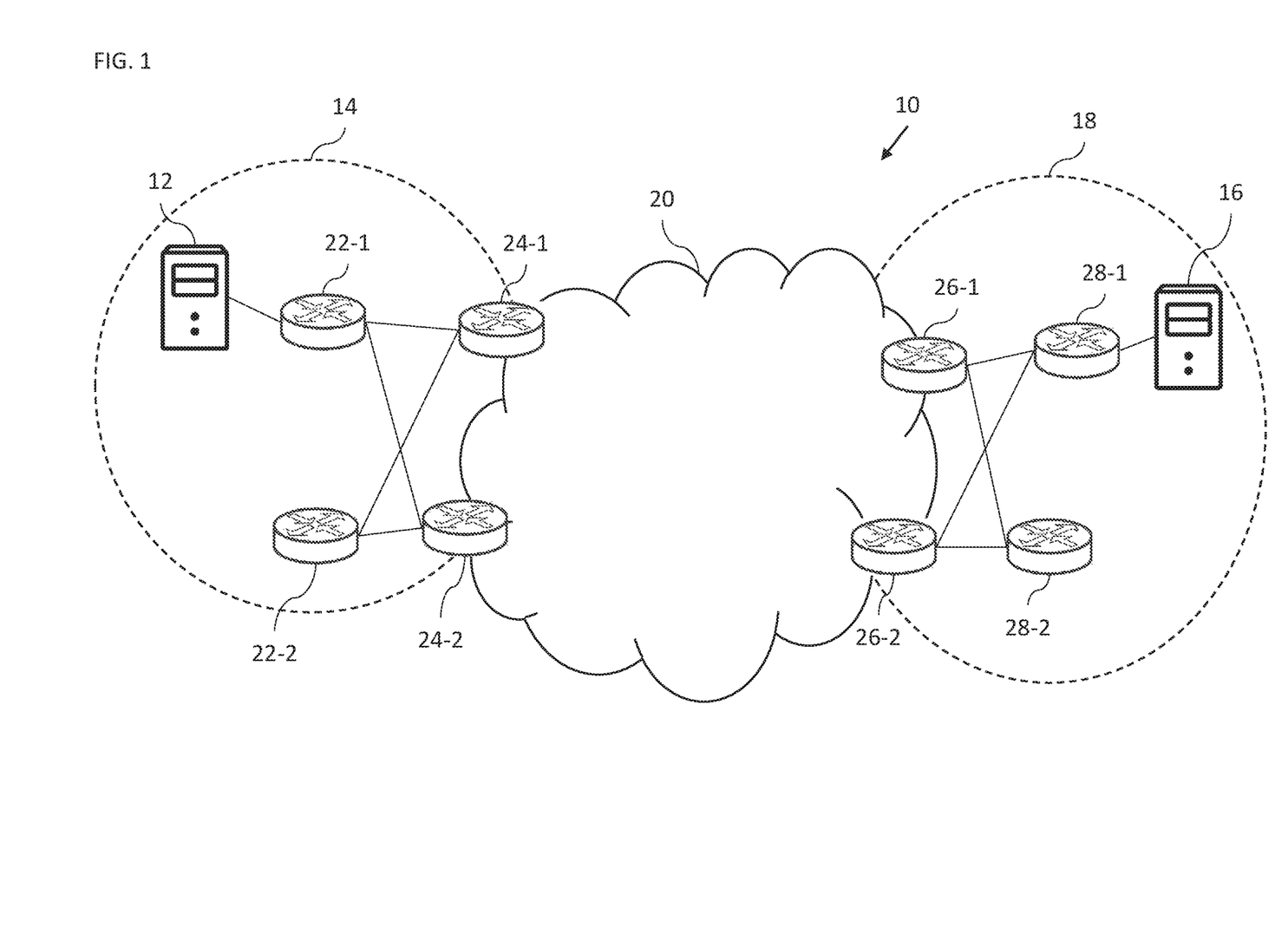
FIG. 1 is a block diagram view of an Ethernet VPN system constructed and operative in accordance with an embodiment of the present invention.

Reference is now made to FIG. 1, which is a block diagram view of an Ethernet VPN system 10 constructed and operative in accordance with an embodiment of the present invention. FIG. 1 shows a device 12 in a local customer-site network 14 communicating with a device 16 in a remote customer-site network 18 via a tunnel in a provider network 20. The term "tunnel", as used in the specification and claims, is defined as a mechanism used to ship a foreign protocol across a network which normally would not support the foreign protocol. Any suitable tunnel may be used in the Ethernet VPN system 10, for example, but not limited to: a Multiprotocol Label Switching (MPLS) tunnel, a Virtual Extensible Local Area Network (VXLAN) tunnel, a Network Virtualization using Generic Routing Encapsulation (NVGRE) tunnel, or a Generic Network Virtualization Encapsulation (GENEVE) tunnel. The local customer-site network 14 has been termed "local" as it is local to the device 12 which is disposed in the local customer-site network 14. The remote customer-site network 18 has been termed "remote" as it is remote to the device 12 which is not located in the remote customer-site network 18. Both the local customer-site network 14 and the remote customer-site network 18 may represent different sites of a single entity, e.g., a single corporation or organization or group. The provider network 20 is typically a public network such as the Internet, or a privately-owned network serving several different corporations, organizations, or groups, or an EVPN tunnel inside a data-center. In some embodiments, the "provider" and "customer" may reside in the same data-center, owned and operated by the same organization. The terms "customer" and "provider" as used in the specification and claims, are meant to convey a logical distinction between two entities and do not necessarily have any economic and/or legal meaning. In some embodiments, the customer and provider may be part of the same organization. In other embodiments, the customer and provider may be part of different organizations.

The local customer-site network 14 includes customer edge (CE) devices 22 and provider edge (PE) devices 24. The PE devices 24 are disposed on the edge between the local customer-site network 14 and the provider network 20. Similarly, the remote customer-site network 18 includes CE devices 26 and PE devices 28. The PE devices 28 are disposed on the edge between the remote customer-site network 18 and the provider network 20.

The Ethernet VPN system 10 may include other customer-site networks in addition to the local customer-site network 14 and the remote customer-site network 18 shown in FIG. 1.

Figure 2:
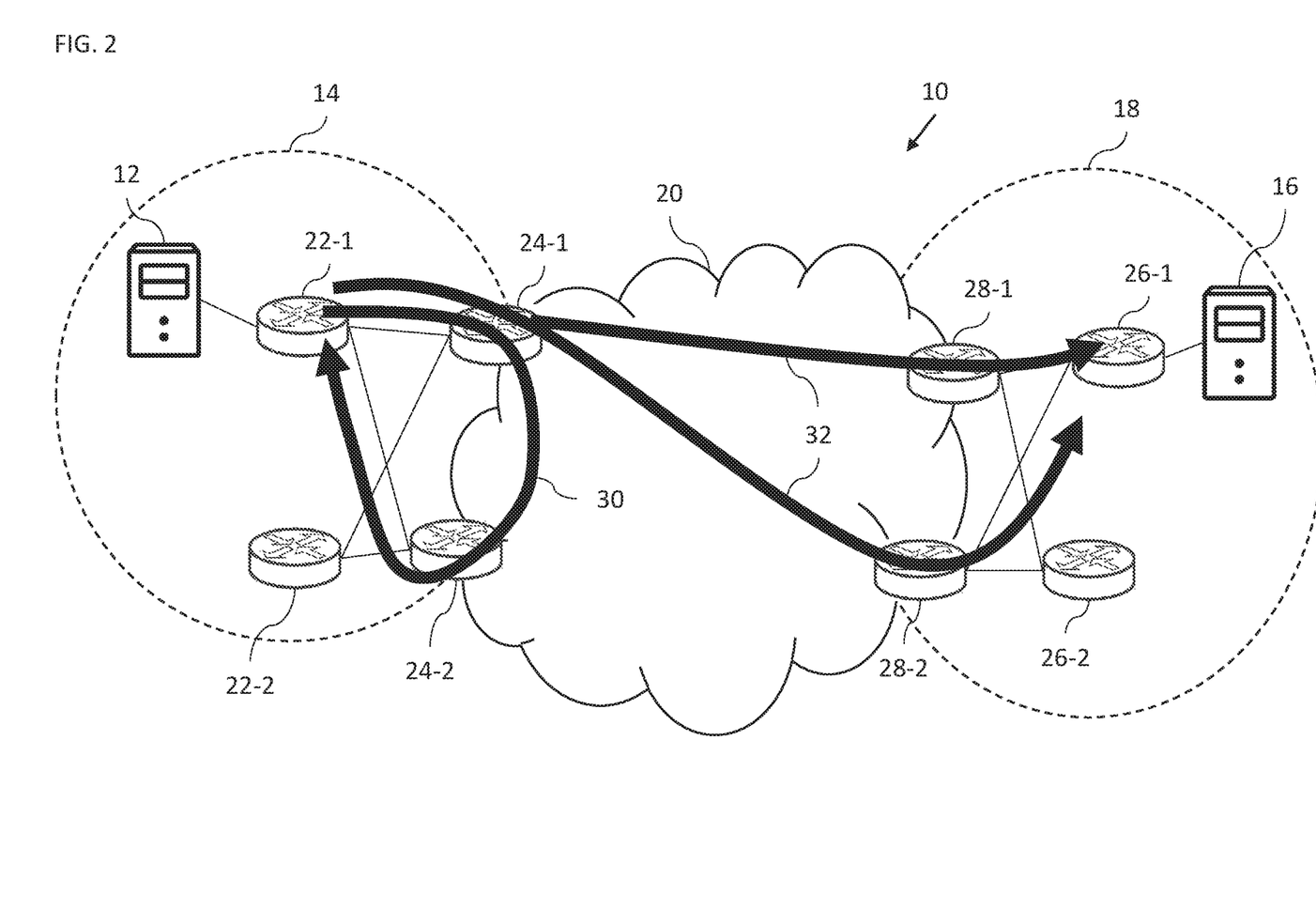
FIG. 2 is a block diagram view of the system of FIG. 1 illustrating duplication problems.

Reference is now made to FIG. 2, which is a block diagram view of the system 10 of FIG. 1 illustrating duplication problems. The packets sent by device 12 may be sent via various routes to the device 16. For example, the packets may be sent via CE device 22-1, PE device 24-1, one or more of the PE devices 28, and via CE device 26-1.

Due to redundant connectivity using BUM traffic, the packets received by PE device 24-1 may be forwarded over the provider network 20 to PE device 24-2. In turn, the PE device 24-2 may forward packets to CE device 22-1 resulting in duplication. This is illustrated by arrow 30.

Additionally, or alternatively, the PE device 24-1 may duplicate packets to both PE devices 28-1, 28-2, which may both try to forward the received packets to CE device 26-1 resulting in duplication. This is illustrated by arrows 32.

As described in the overview section, the duplication problem illustrated by arrow 30 may be solved using rule 6, namely:

BUM && neighbor_SIP && Egress Port && Decap (rule 6).

The duplication problem illustrated by the arrow 32 may be solved using rule 5, namely:

BUM && Decap && VID && Egress Port (rule 5).

A combined rule to solve both duplication problems may be implemented using rule 7, namely:

BUM && Decap && Egress Port && (VID||neighbor_SIP) (rule 7).

Figure 3:
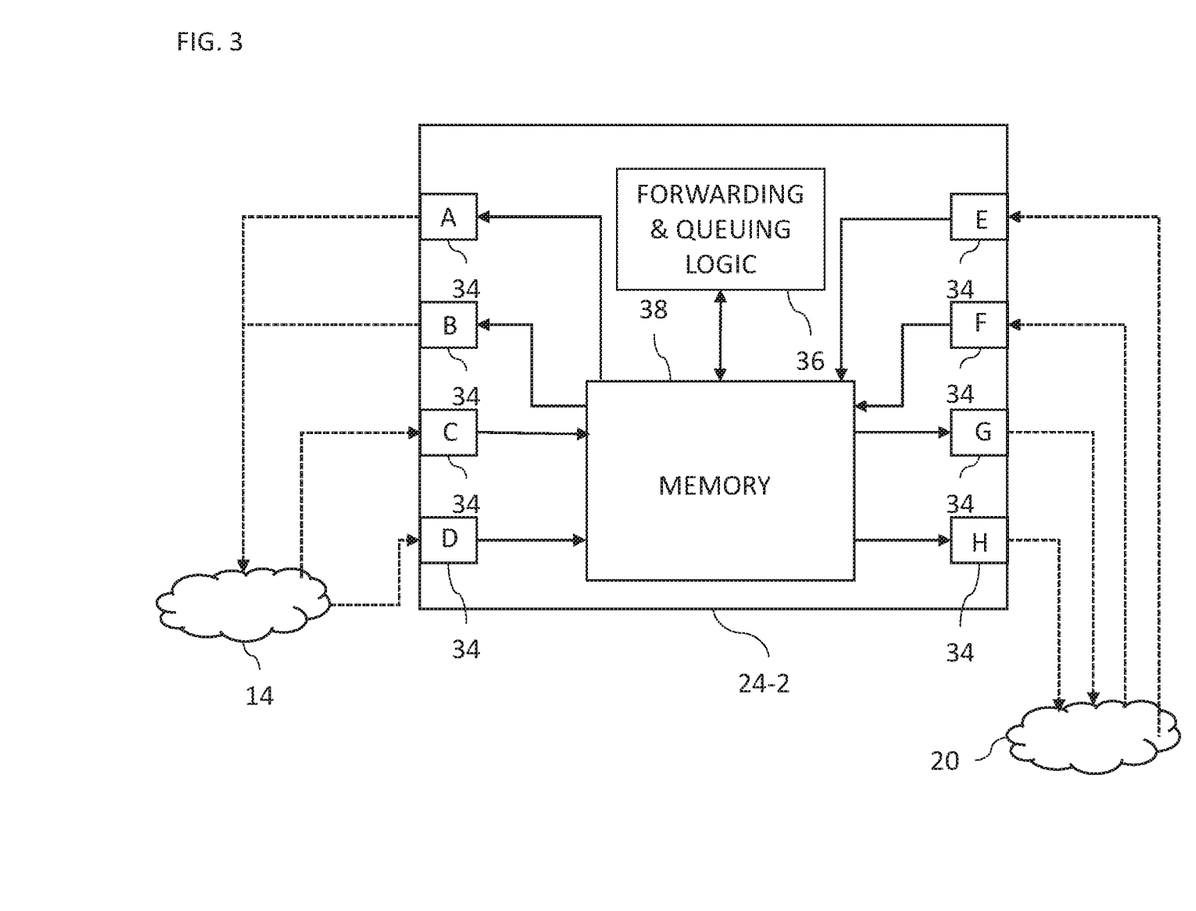
FIG. 3 is a block diagram view of a provider-edge device for use in the system of FIG. 1.

Reference is now made to FIG. 3, which is a block diagram view of the PE device 24-2 for use in the system 20 of FIG. 1. The other PE devices 24, 28 or any other suitable network device may be implemented in a similar manner as the PE device 24-2 described below.

The PE device 24-2 has multiple interfaces, in the form of ports 34, some of which are connected to the local customer-site network 14 and at least one is connected to the provider network 20.

Ports 34, which are labeled with letters A-H for clarity in the description that follows, are configured to serve as ingress and egress ports (or equivalently, ingress and egress interfaces) to respective networks 14, 20. In the example of FIG. 3, ports 34A-D are connected to the local customer-site network 14, while ports 34E-H are connected to the provider network 20. The ports 34 typically comprise suitable physical-layer (PHY) and data-link layer interface circuits, as are known in the art.

The ingress ports are configured for receiving network packets from nodes (such as the CE devices 26) disposed in at least one remote customer-site network 18 via a tunnel in the provider network 20, and from nodes (such as CE devices 22) in the local customer-site network 14. The egress ports are configured for forwarding at least some of the received network packets, so as to transfer packets between the nodes of the remote customer-site network(s) 18 and the nodes of the local customer-site network 14. Although for the sake of illustration, ports 34C-F serve in FIG. 3 as ingress ports, while ports 34A-B, 34G-H serve as egress ports, in practice all ports 34 are typically configured for bidirectional operation, as both ingress and egress ports.

Ports 34C-D receive packets from local customer-site network 14 belonging to multiple flows, for forwarding to respective egress interfaces for transmission to the provider network 20. Ports E-F receive packets from the provider network 20 for forwarding to respective egress interfaces for transmission to the local customer-site network 14 or back to the provider network 20.

The PE device 24-2 comprises control circuitry, in the form of forwarding and queuing logic 36, which forwards incoming packets to the appropriate egress ports for transmission to the local customer-site network 14 or the provider network 20, as relevant. Logic 36 queues the packets that are destined for each egress port in transmit queues in a memory 38, while the packets await their turn for transmission. Logic 36 does not necessarily transmit the packets through a given egress port in their order of arrival, however, but rather may give higher priority to certain queues over others.

The forwarding and queuing logic 36 also encapsulates packets received from the local customer-site network 14 with an encapsulation header for transmission over the provider network 20, and decapsulates packets arriving from the provider network 20 for transmission to the local customer-site network 14. The PE device 24-2 may also receive packets from the provider network 20 for retransmission (without decapsulation) over the provider network 20, for example, to the PE device 24-1 or to one or more of the PE devices 28, and may receive packets from the local customer-site network 14 for transmission (without encapsulation or decapsulation) to an entity in the same local customer-site network 14.

The configurations of PE device 24-2 and networks 14, 20 that are shown in FIG. 3 are example configurations, which are chosen purely for the sake of conceptual clarity. In alternative embodiments, any other suitable network and/or network device configuration can be used. Logic 36 typically comprises hard-wired or programmable logic circuits, such as one or more Application-Specific Integrated Circuits (ASICs) or Field-Programmable Gate Arrays (FPGAs). Alternatively, or additionally, at least some of the functions of logic 36 may be implemented in software or firmware running on a programmable processor.

The forwarding and queuing logic 36 is configured to analyze the received network packets and make a decision to drop a network packet of the received network packets to reduce packet duplication of the network packet in at least one of the nodes, according to rule 7, responsively to: the network packet being identified as a packet of broadcast, unknown unicast, or multicast (BUM) traffic; the network packet being subject to decapsulation of an encapsulation header of the network packet by the forwarding and queuing logic 36; the network packet being assigned to one of the egress ports; and a header of the network packet including: one of a plurality of virtual local area network (VLAN) identifications (VIDs); or one of a plurality of source identifications. The term "subject to decapsulation" as used in the specification and claims is defined to include the packet being currently decapsulated, already been decapsulated, or going to be decapsulated, by the forwarding and queuing logic 36.

In some embodiments, the forwarding and queuing logic 36 is configured to make the decision to drop the network packet according to rule 7 responsively to: the network packet being identified as a packet of BUM traffic; the network packet being subject to decapsulation of the encapsulation header of the network packet by the forwarding and queuing logic 36; and the header of the network packet including: one of the VLAN identifications (VIDs), for which the assigned egress port (to which the packet is assigned by the forwarding and queuing logic 36) is not a designated forwarder; or one of the source identifications of respective nodes (neighbor nodes) disposed in the local customer-site network 14 and that neighbor node is connected to the assigned egress port. It should be noted that for any egress port there may be one or more VIDs for which that egress port is not the designated forwarder. Similarly, for any egress port there may be neighbor nodes having source identifications (e.g., source IP addresses of neighbor nodes) to which the egress port is connected.

In some embodiments, the forwarding and queuing logic 36 is configured to make the decision to drop the network packet according to rule 5 responsively to: the network packet being identified as a packet of BUM traffic; the network packet being subject to decapsulation of the encapsulation header of the network packet by the forwarding and queuing logic 36; and the header of the network packet including one of the VLAN identifications (VIDs), for which the assigned egress port is not a designated forwarder.

In some embodiments, the forwarding and queuing logic 36 is configured to make the decision to drop the network packet according to rule 6 responsively to: the network packet being identified as a packet of BUM traffic; the network packet being subject to decapsulation of the encapsulation header of the network packet by the forwarding and queuing logic 36; and the header of the network packet including one of the source identifications of respective nodes (neighbor nodes) disposed in the local customer-site network 14 and that neighbor node is connected to the assigned egress port.

In order to apply the filtering rules, the forwarding and queuing logic 36 may be configured to identify the network packet as a packet of BUM traffic responsively to the header of the network packet and/or at least one local forwarding decision or any suitable method to identify BUM traffic. By way of example, broadcast traffic may be identified from the MAC address of FF:FF:FF:FF:FF:FF. By way of another example, unknown (for both Unicast and Multicast) traffic may be identified as follows. Packets from a local network may be identified by hardware as unknown responsively to a lookup failure. Packets from a remote network may be identified as unknown based on a signal in the packet header indicating that the remote network has an unknown address. By way of yet another example, multicast traffic may be identified if "bit40" is set.

The forwarding and queuing logic 36 is also configured to identify whether the network packet is subject to decapsulation of the encapsulation header of the network packet for example, by examining a header of the network packet to determine if it includes an encapsulation header using data supplied from a parsing process performed by the ports 34 or the forwarding and queuing logic 36. As previously mentioned, decapsulation is performed for packets from the provider network 20 to the local customer-site network 14. Therefore, the route of packets is determined (for example, based on Ingress_port and Egress_port). Then based on the route of the traffic it may be determined whether the network packet will undergo, or has undergone decapsulation.

As the forwarding and queuing logic 36 assigns the packets to the egress ports, the forwarding and queuing logic 36 may retrieve data indicative of which egress port a packet is assigned to. The forwarding and queuing logic 36 may determine the VIDs and the source IP addresses of the packets from packet headers based on header data extracted by a parser in the PE device 24-2.

Figure 4:
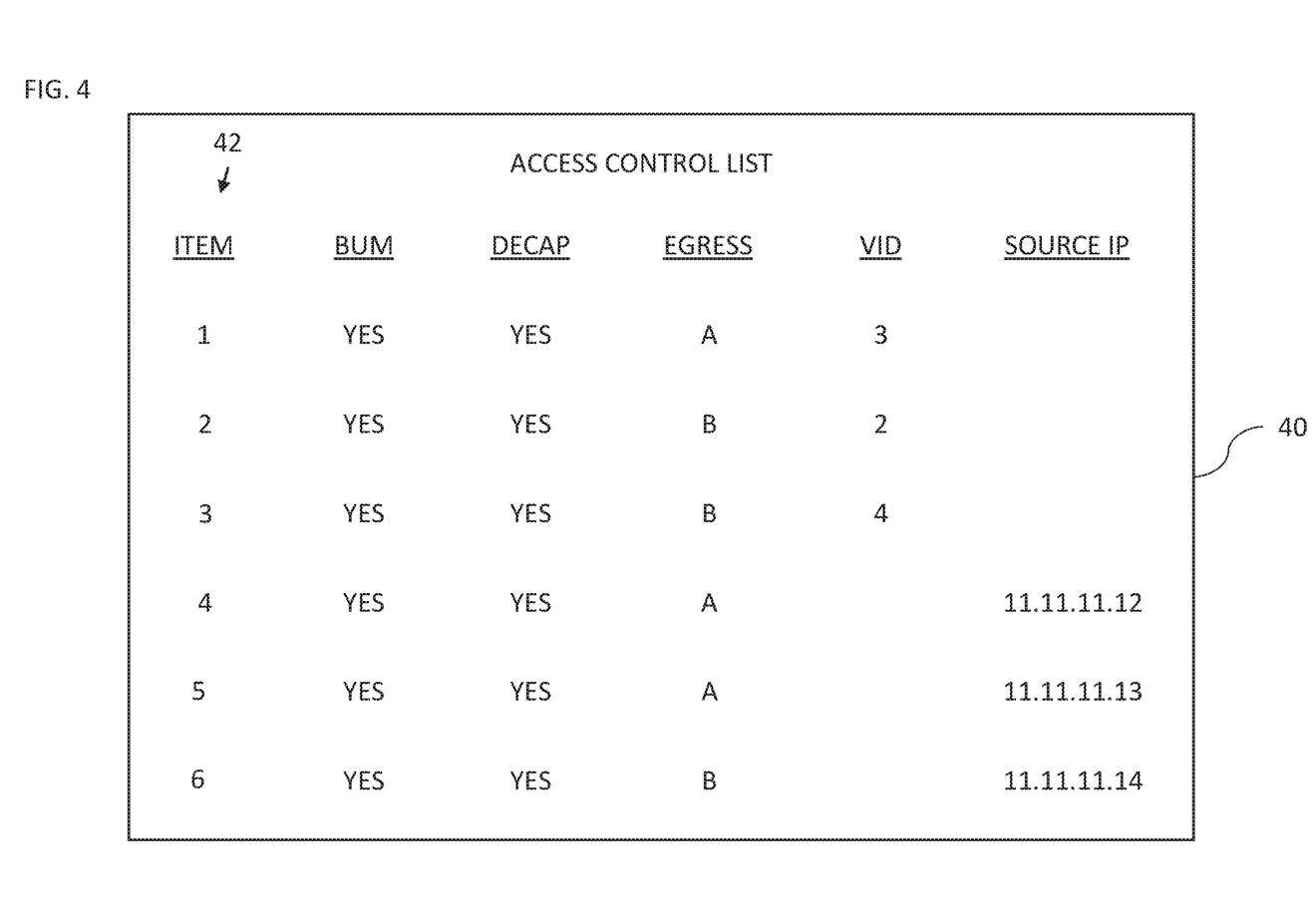
FIG. 4 is an example access control list for use in the provider-edge device of FIG. 3.

Reference is now made to FIG. 4, which is an example access control list 40 for use in the PE device 24-2 of FIG. 3.

In some embodiments, the memory 38 is configured to store at least one access control list 40. The forwarding and queuing logic 36 may then make the decision to drop the network packet responsively to the access control list(s) 40.

The example access control list 40 shown in FIG. 4 includes multiple filter line items 42. Each filter line item stipulates the filter conditions. For example, filter line item 1, stipulates that a packet of BUM traffic, which is subject to decapsulation by the forwarding and queuing logic 36, is assigned to egress port A and has VID 3 should be dropped.

The access control list 40 shown in FIG. 4 may be divided into two lists, for example, one listing the egress port and VID pairs and the other listing the egress port and source IP address pairs.

The forwarding and queuing logic 36 (FIG. 3) may be configured to generate filter line items for populating the access control list(s) 40 so that the forwarding and queuing logic 36 is configured to drop the network packet responsively to: the network packet being identified as a packet of BUM traffic; the network packet being subject to decapsulation of the encapsulation header of the network packet by the forwarding and queuing logic 36; the network packet being assigned to one of the egress ports; and the header of the network packet including: one of the VLAN identifications (VIDs); or one of the source identifications or according to any of the rules listed above.

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The software components of the present invention may, if desired, be implemented in ROM (read only memory) form. The software components may, generally, be implemented in hardware, if desired, using conventional techniques. The software components may be instantiated, for example: as a computer program product or on a tangible medium. In some cases, it may be possible to instantiate the software components as a signal interpretable by an appropriate computer, although such an instantiation may be excluded in certain embodiments of the present invention.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and subcombinations of the various features described hereinabove, as well as variations and modifications thereof which would occur to persons skilled in the art upon reading the foregoing description and which are not disclosed in the prior art.

What is claimed is:
1. A network device comprising:
multiple interfaces configured to serve as:
ingress ports for receiving network packets from nodes disposed in at least one remote customer-site net- work via a tunnel in a provider network, and from nodes in a local customer-site network; and egress ports for forwarding at least some of the network packets, so as to transfer packets between the nodes of the at least one remote customer-site network and the nodes of the local customer-site network; and control circuitry configured to analyze the received network packets and make a decision to drop a network packet of the received network packets to reduce packet duplication of the network packet in at least one of the nodes, responsively to:

the network packet being identified as a packet of broadcast, unknown unicast, or multicast (BUM) traffic;

the network packet being subject to decapsulation of an encapsulation header of the network packet by the control circuitry;

the network packet being assigned to one of the egress ports; and a header of the network packet including: one of a plurality of virtual local area network (VLAN) identifications; or one of a plurality of source identifications.

2. The device according to claim 1, wherein the control circuitry is configured to make the decision to drop the network packet responsively to:

the network packet being identified as a packet of BUM traffic;

the network packet being subject to decapsulation of the encapsulation header of the network packet by the control circuitry; and the header of the network packet including: one of the VLAN identifications, for which the assigned egress port is not a designated forwarder; or one of the source identifications of respective nodes disposed in the local customer-site network and connected to the assigned egress port.

3. The device according to claim 1, wherein the control circuitry is configured to make the decision to drop the network packet responsively to:

the network packet being identified as a packet of BUM traffic;

the network packet being subject to decapsulation of the encapsulation header of the network packet by the control circuitry; and the header of the network packet including one of the VLAN identifications, for which the assigned egress port is not a designated forwarder.

4. The device according to claim 1, wherein the control circuitry is configured to make the decision to drop the network packet responsively to:

the network packet being identified as a packet of BUM traffic;

the network packet being subject to decapsulation of the encapsulation header of the network packet by the control circuitry; and the header of the network packet including one of the source identifications of respective nodes disposed in the local customer-site network and connected to the assigned egress port.

5. The device according to claim 1, wherein the control circuitry is configured to identify the network packet as a packet of BUM traffic responsively to the header of the network packet and/or at least one local forwarding decision.

6. The device according to claim 1, wherein each of the plurality of source identifications includes a source IP address.

7. The device according to claim 1, further comprising a memory configured to store at least one access control list, the control circuitry being configured to generate filter line items for populating the at least one access control list so that the control circuitry is configured to drop the network packet responsively to:

the network packet being identified as a packet of BUM traffic;

the network packet being subject to decapsulation of the encapsulation header of the network packet by the control circuitry;

the network packet being assigned to one of the egress ports; and the header of the network packet including: one of the VLAN identifications; or one of the source identifications.

8. A packet filtering method, comprising:

receiving network packets from nodes disposed in at least one remote customer-site network via a tunnel in a provider network, and from nodes in a local customer-site network;

forwarding at least some of the network packets, so as to transfer packets between the nodes of the at least one remote customer-site network and the nodes of the local customer-site network;

analyzing the received network packets and making a decision to drop a network packet of the received network packets to reduce packet duplication of the network packet in at least one of the nodes, responsively to:

the network packet being identified as a packet of broadcast, unknown unicast, or multicast (BUM) traffic;

the network packet being subject to decapsulation of an encapsulation header of the network packet;

the network packet being assigned to one of a plurality of egress ports; and a header of the network packet including: one of a plurality of virtual local area network (VLAN) identifications; or one of a plurality of source identifications.

9. The method according to claim 8, wherein the making the decision to drop the network packet is performed responsively to:

the network packet being identified as a packet of BUM traffic;

the network packet being subject to decapsulation of the encapsulation header of the network packet; and the header of the network packet including: one of the VLAN identifications, for which the assigned egress port is not a designated forwarder; or one of the source identifications of respective nodes disposed in the local customer-site network and connected to the assigned egress port.

10. The method according to claim 8, wherein the making the decision to drop the network packet is performed responsively to:

the network packet being identified as a packet of BUM traffic;

the network packet being subject to decapsulation of the encapsulation header of the network packet; and the header of the network packet including one of the VLAN identifications, for which the assigned egress port is not a designated forwarder.

11. The method according to claim 8, wherein the making the decision to drop the network packet is performed responsively to:

the network packet being identified as a packet of BUM traffic;

the network packet being subject to decapsulation of the encapsulation header of the network packet; and the header of the network packet including one of the source identifications of respective nodes disposed in the local customer-site network and connected to the assigned egress port.

12. The method according to claim 8, further comprising identifying the network packet as a packet of BUM traffic responsively to the header of the network packet and/or at least one local forwarding decision.

13. The method according to claim 8, wherein each of the plurality of source identifications includes a source IP address.

14. The method according to claim 8, further comprising:

storing at least one access control list; and generating filter line items for populating the at least one access control list so that the making the decision to drop the network packet is performed responsively to:

the network packet being identified as a packet of BUM traffic;

the network packet being subject to decapsulation of the encapsulation header of the network packet;

the network packet being assigned to one of the egress ports; and the header of the network packet including: one of the VLAN identifications; or one of the source identifications.

15. A software product, comprising a non-transient computer-readable medium in which program instructions are stored, which instructions, when read by a central processing unit (CPU), cause the CPU to:

receive network packets from nodes disposed in at least one remote customer-site network via a tunnel in a provider network, and from nodes in a local customer-site network;

forward at least some of the network packets, so as to transfer packets between the nodes of the at least one remote customer-site network and the nodes of the local customer-site network;

analyze the received network packets and make a decision to drop a network packet of the received network packets to reduce packet duplication of the network packet in at least one of the nodes, responsively to:

the network packet being identified as a packet of broadcast, unknown unicast, or multicast (BUM) traffic;

the network packet being subject to decapsulation of an encapsulation header of the network packet;

the network packet being assigned to one of a plurality of egress ports; and a header of the network packet including: one of a plurality of virtual local area network (VLAN) identifications; or one of a plurality of source identifications.

* * * * *